United States Patent [19]

Nara

[11] Patent Number: 4,560,288
[45] Date of Patent: Dec. 24, 1985

[54] THERMOMETER FOR MEASURING CRYOGENIC TEMPERATURES

[75] Inventor: Koichi Nara, Ibaraki, Japan

[73] Assignees: Agency of Industrial Science & Technology; Ministry of International Trade & Industry, both of Tokyo, Japan

[21] Appl. No.: 611,537

[22] Filed: May 17, 1984

[30] Foreign Application Priority Data

May 20, 1983 [JP] Japan .................................. 58-88758

[51] Int. Cl.$^4$ .............................................. G01K 5/00
[52] U.S. Cl. .................................. 374/201; 374/203; 374/176
[58] Field of Search ............... 374/143, 187, 201, 202, 374/24, 176, 141, 142, 203, 16; 62/49; 116/220, 268, 270, 273

[56] References Cited

U.S. PATENT DOCUMENTS 3,064,245 11/1962 Lindberg .............................. 374/201
3,308,646 3/1967 Singleton ............................. 374/176
3,436,713 4/1969 Noia ..................................... 374/176
3,555,483 1/1971 Tener .................................... 374/176
3,625,059 12/1971 Camus et al. ........................ 374/176
3,992,944 11/1976 Woodle ................................ 374/203

Primary Examiner—Charles Frankfort
Assistant Examiner—David R. Schuster
Attorney, Agent, or Firm—Oblon, Fisher, Spivak, McClelland & Maier

[57] ABSTRACT

A thermometer comprises a first sample space having a liquefiable gas sealed therein and a second sample space partitioned from the first sample space by a pressure difference detecting element and having a liquefiable gas sealed therein in conjunction with an adsorbent. As this thermometer is cooled to cryogenic temperatures, the second sample space is vacuumized by the action of the adsorbent. As the pressure difference detected by pressure difference detecting element at this is equal to the vapor pressure in the first sample space, the temperature can be accurately measured from the detected pressure difference.

15 Claims, 4 Drawing Figures

THERMOMETER FOR MEASURING CRYOGENIC TEMPERATURES

BACKGROUND OF THE INVENTION

1. Field of the Invention

This invention relates to a small, precision thermometer for measuring cryogenic temperatures.

2. Description of the Prior Art

The vapor pressure which is produced when a gas is liquefied is always stable and, therefore, is widely used as the standard for the graduation of temperature. A thermometer which uses the vapor pressure of a liquefied gas as the standard graduation generally requires a bulky pressure measuring system which introduces an element of error into the measurement since it is located in an atmosphere at room temperature. The disadvantage of the conventional thermometer makes it desirable to provide a small, precision vapor-pressure thermometer for the measurement of cryogenic temperatures.

To meet this need, a vapor-pressure thermometer having a gas specimen sealed in a container at room temperature under a prescribed pressure in conjunction with a pressure sensitive element has been devised. When the sealed gas once liquefied at cryogenic temperatures returns to room temperature, its pressure increases to several tens of times the condensing pressure. The pressure sensitive element used in the container is required to be resistant to this pressure. Therefore, the pressure sensitive element is inevitably designed to provide this resistance at a sacrifice of sensitivity.

SUMMARY OF THE INVENTION

An object of this invention is to provide a small, precision self-calibrating thermometer for the measurement of cryogenic temperature.

To accomplish this object according to the present invention, there is provided a thermometer which comprises a first sample space having sealed therein a gas liquefiable at a cryogenic temperature, a second sample space possessing a portion adjoining the first sample space and having sealed therein a liquefiable gas of equal pressure and an adsorbent, and a pressure difference detecting element disposed in the aforementioned adjoining portion of the second sample space.

When this thermometer is cooled to a cryogenic temperature, the gas in the second sample space is adsorbed on the adsorbent and the interior of this space is substantially vacuumized. As the thermometer is further lowered, the gas in the first sample space is liquefied. After the gas in the first sample space has been liquefied, the temperature of the atmosphere inside the thermometer can be determined by measuring the pressure difference between the two sample spaces with the pressure difference detecting element. The maximum pressure difference exerted on the pressure difference detecting element represents the pressure peculiar to the cryogenic temperature at that time. And as this difference is very small, the cryogenic temperature can be measured accurately with a pressure difference detecting element of high sensitivity having a small dynamic range. Since this thermometer has a very simple construction substantially characterized by having the interior of a container partitioned into two spaces by a pressure difference element, it can be easily miniaturized. Besides, since it measures temperature on the basis of vapor pressure, it constitutes a self-calibrating thermometer.

The other objects and characteristics of this invention will become apparent from the further disclosure of the invention to be made in the following detailed description of a preferred embodiment, with reference to the accompanying drawings.

DESCRIPTION OF THE PREFERRED EMBODIMENT

Figure 1:
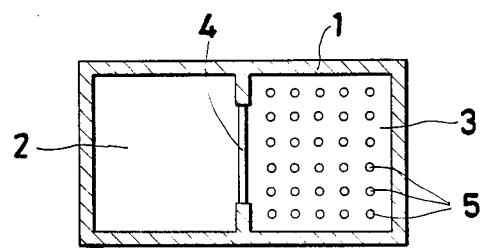
FIG. 1 is a schematic structural view illustrating the principle of the thermometer of this invention.

FIG. 1 represents a schematic structural view showing the principle of the thermometer of this invention for the measurement of cryogenic temperatures. The interior of a pressure-proof enclosure 1 is partitioned by a pressure difference detecting element 4 into a first sample space 2 and a second sample space 3. The first sample space 2 is filled at room temperature under pressure with a gas liquefiable at a cryogenic temperature. Similarly, the second sample space 3 is filled at room temperature under pressure with a similarly liquefiable gas in conjunction with an adsorbent 5 and sealed under the same pressure.

Examples of gases liquefiable at cryogenic temperatures and usable in the two sample spaces mentioned above are helium, neon, and hydrogen. The gas is sealed in the two sample spaces under an equal pressure of at least about 80 atmospheres. Use of a higher pressure results in a proportional rise in the upper limit of measurable temperature and also makes it necessary to increase proportionally the amount of the adsorbent placed in the second sample space 3. Use of a lower pressure results in a proportional drop in the upper limit of measurable temperature. The gases contained under pressure in the two sample spaces are not required to be of one same kind. The first sample space may be filled with helium and the second sample space with hydrogen, for example.

As examples of the adsorbent 5 to be sealed in the second sample space 3 in conjunction with the liquefiable gas can be mentioned activated carbon and zeolite. The amount of the adsorbent sealed in the second sample space is such that by the time the gas in the first sample space is liquefied, the adsorbent has completely adsorbed the gas sealed in the second sample space and has vacuumized the interior of this space. For example, when zeolite is used as the adsorbent and the sample space contains helium under 80 atmospheres, this adsorbent must be contained in an amount of about 0.7 g per 1 cc of the inner volume of the sample space. If the amount of the adsorbent sealed in the sample space is not sufficient, the adsorption temperature is lowered and the pressure of the sealed gas cannot be heightened. The adsorbent begins its adsorbing action vigorously near 20 K with helium and about 40 K with hydrogen.

The pressure difference detecting element 4 disposed between the two sample spaces 2, 3 is typically a diaphragm type detector element formed to have a stationary electrode and a movable electrode opposed to each other.

Figure 2:
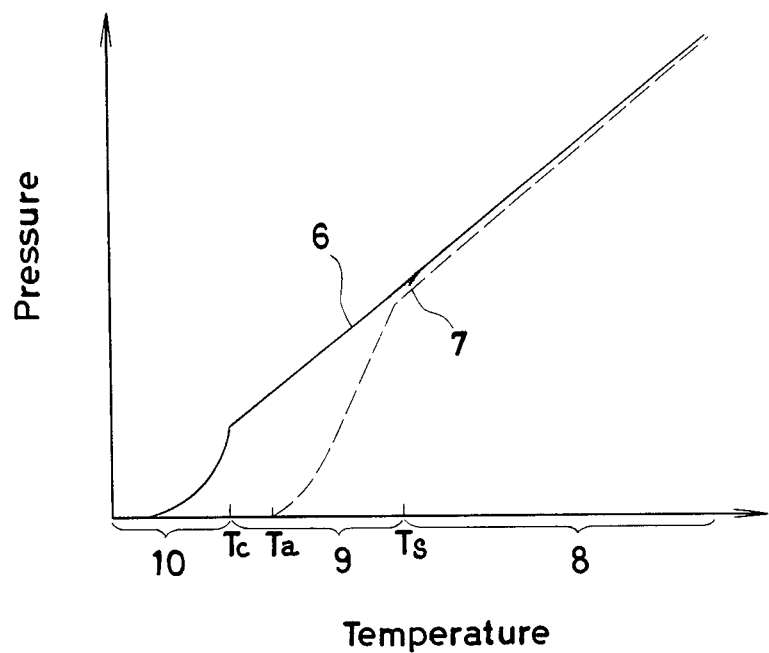
FIG. 2 is a graph showing the relation between the pressures in the two sample spaces of the thermometer of this invention and the temperature.

When the thermometer constructed as described above is placed in a refrigerator and cooled, the pressures in the two spaces fall proportionally with the falling temperature in the temperature zone 8 (FIG. 2) in which the adsorbent in the second sample space 3 exhibits substantially no adsorbing activity. Depending on the kind of gas sealed in the sample space, there are times when the adsorbent manifests its activity and causes the pressure in the second sample space to surpass the pressure in the first sample space. This difference, however, is so small that it will have no effect upon the accuracy of measurement. In the graph of FIG. 2, the solid line 6 represents the pressure inside the first sample space 2, the dotted line 7 the pressure inside the second sample space 3, Ts the temperature at which the adsorbent in the second sample space begins to actively exhibit its adsorbing function, Ta the temperature at which the gas in the second sample space has completely been adsorbed, and Tc the temperature at which the gas in the first sample space begins to be liquefied and which is the upper limit of the temperature which the thermometer can measure.

As the cooling is further continued (into the temperature zone 9), the adsorbent 5 inside the second sample space 3 vigorously adsorbs the gas sealed therein, causing the pressure within the sample space 3 to fall sharply until eventually assuming the state of a vaccum. When the gas inside the sample space 3 is adsorbed by the adsorbent 5 and the pressure therein falls substantially to zero (temperature Ta), the pressure inside the first sample space 2 continues to fall proportionally with falling temperature. Within the temperature zone 9, however, no liquefaction of the gas within this sample space occurs. As the cooling is further continued toward cryogenic temperatures, the adsorbed gas inside the second sample space is powerfully bound to the adsorbent and assumes a state approximating that of a solid and, consequently, is prevented from being liquefied and released into the interior of the space. Thus, the interior of the second sample space 3 continues to remain in a substantially vacuum state, and as soon as the temperature inside the first sample space 2 reaches Tc, the gas is liquefied and the pressure falls abruptly.

The maximum pressure difference between the two sample spaces exerted on the pressure difference detecting element 4 disposed along the boundary between the two spaces 2, 3 occurs in the temperature zone 9 between the temperature (Ts) at which the adsorbent begins to adsorb the gas inside the second sample space 3 and the temperature (Tc) at which the gas inside the first sample space 2 begins to undergo liquefaction. In the temperature zone 10, since the pressure inside the sample space 3 is substantially zero, the pressure difference between the two sample spaces represents the vapor pressure inside the sample space 2. Since the kind of the gas and the relation between the vapor pressure and the temperature are known in advance, the detection of this pressure difference or the vapor pressure permits determination of the temperature of the environment in which the thermometer is placed.

The thermometer of this invention utilizes the phenomenon that the adsorption of the gas by the adsorbent takes place at a temperature higher than the temperature at which the gas is liquefied. The maximum pressure difference exerted upon the pressure difference detecting element occurs under the condition of a cryogenic temperature far below the room temperature and is small. Thus, use of a pressure difference detecting element of high sensitivity having a small dynamic range will suffice for the detection. The thermometer of this invention, therefore has a very simple construction and yet provides highly accurate measurement of cryogenic temperatures.

The samples spaces can be formed other than by partitioning the interior of a single pressure-proof enclosure with an interposed pressure difference detecting element. They may be formed, for example, by adjoining two sample spaces to each other, forming in the boundary thereof an opening enabling the two sample spaces to communicate with each other, and disposing in the opening a pressure difference detecting element. The shells of the sample spaces may be made of copper or other similar material having high thermal conductivity. The outside dimensions of the thermometer can be decreased to a diameter of about 15 mm and a length of about 20 mm.

Figure 3:
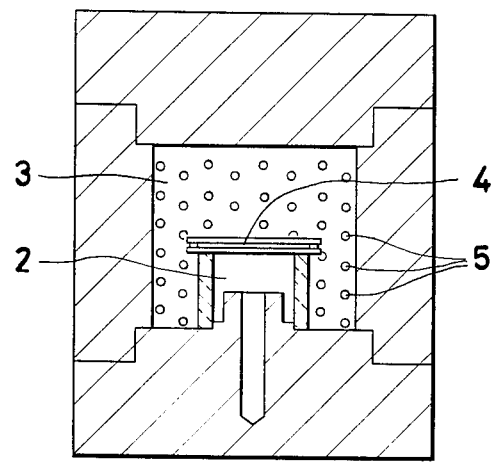
FIG. 3 is a cross section illustrating an embodiment of the thermometer of this invention.

Now, this invention will be described below with reference to an example. As illustrated in FIG. 3, a first sample space 2 formed of a quartz tube 7 mm in inside diameter and 6 mm in height was disposed inside a second sample space 3 formed of a copper tube 20 mm in inside diameter. As the adsorbent, 2 g of zeolite (molecular sieve 5A) was placed in the second sample space 3. In the leading end of the first sample space 2 was formed an opening permitting communication of the first sample space 2 with the second sample space 3. In this opening was fitted a pressure difference detecting element 4 consisting of a stationary electrode and a quartz diaphragm. The first sample space 2 and the second sample space 3 were each filled at room temperature with helium under pressure of 80 atmospheres and then sealed.

Figure 4:
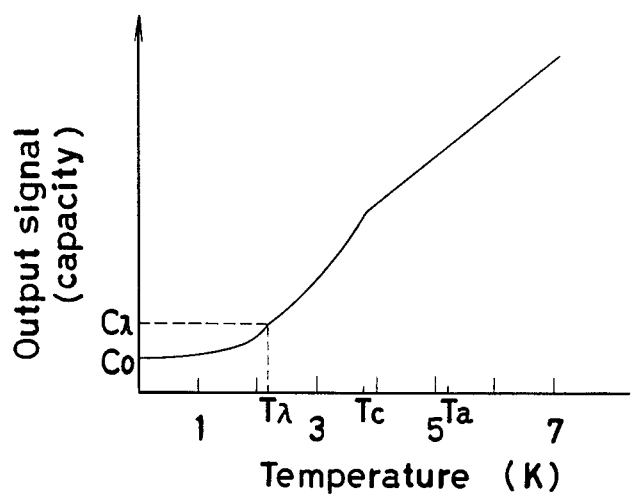
FIG. 4 is a graph showing a typical relation between the temperature and the output (capacitance) signal of the thermometer of this invention.

The thermometer consequently obtained was placed in a helium-3 cryostat and cooled. The electric capacity signals issued from the diaphragm after the thermometer had been cooled to below 7 K were as shown in the graph of FIG. 4. When the temperature fell to about 5 K, the second sample space was vacuumized ($T_a$). When it further fell to 3.8 K, the gas inside the first sample space began to liquefy, and the electric capacity C and the vapor pressure P assumed the following relation.

$$\frac{1}{C} = \alpha + \beta \cdot P$$

wherein $\alpha$ and $\beta$ are constants specific to the thermometer. The constants $\alpha$ and $\beta$ for helium were determined with the aid of a helium-3 cryostat as follows. The constant $\alpha$ was determined in accordance with the formula, $$\alpha = \frac{1}{C_o},$$

wherein $C_o$ stands for the electric capacity existing when the cooling was continued to 0.3 K. The constant $\beta$ was determined in accordance with the formula, $$\beta = \left(\frac{1}{C_\lambda} - \frac{1}{C_o}\right) / 5042$$

wherein $C_\lambda$ stands for the electric capacity at the lambda point of helium.

Since this thermometer requires no reference thermometer for the determination of the constants $\alpha$ and $\beta$, it functions as a self-calibrating thermometer and enables measurement of cryogenic temperatures with an accuracy of the order of 10 mK.

What is claimed is:

1. A thermometer for the measurement of cryogenic temperatures, said thermometer comprising:
   (a) a first sample space having sealed therein a first gas which is liquefiable at a cryogenic temperature, said first gas having a predetermined first pressure at a predetermined first temperature;
   (b) a second sample space adjoining said first sample space and having sealed therein a second gas which is liquefiable at a cryogenic temperature and an adsorbent, said adsorbent being present in said second sample space in sufficient quantity to at least substantially completely absorb all of said second gas at a cryogenic temperature, said second gas having a predetermined first pressure at a predetermined first temperature; and
   (c) a pressure difference detecting element operatively connected to both said first sample space and said second sample space,
   whereby:
   (d) said pressure difference detecting element detects changes in the pressure differential between said first and second sample spaces as said first and second sample spaces are subjected to cryogenic temperatures different from their first predetermined temperatures; and
   (e) said changes in the pressure differential between said first and second sample spaces provide a measure of the cryogenic temperature to which said first and second sample spaces are subjected.

2. A thermometer as recited in claim 1 wherein:
   (a) said first predetermined pressure of said first and second gases are identical;
   (b) said first predetermined temperature of said first and second gases are identical; and
   (c) said first predetermined temperature of said first and second gases are both room temperature.

3. A thermometer for the measurement of cryogenic temperatures, said thermometer comprising:
   (a) a first sample space having sealed therein a first gas which liquefies at a cryogenic temperature $T_c$, said first gas having a predetermined first pressure at a predetermined first temperature;
   (b) a second sample space adjoining said first sample space and having sealed therein:
      (i) a second gas having a predetermined first pressure at a predetermined first temperature and
      (ii) an adsorbent which begins to absorb said second gas at a cryogenic temperature $T_s$ which is higher than the temperature $T_c$, said adsorbent being present in said second sample space in sufficient quantity to at least substantially completely absorb all of said second gas at a cryogenic temperature $T_a$, the temperature $T_a$ being lower than the temperature $T_s$ but higher than the temperature $T_c$; and
   (c) a pressure difference detecting element operatively connected to both said first sample space and said second sample space,
   whereby:
   (d) when the temperature is below $T_a$, said pressure difference detecting element detects the difference between the pressure in said first sample space and an at least essentially zero pressure in said second sample space;
   (e) when the temperature is below $T_c$, the pressure in said first sample space is the equilibrium vapor pressure of said first gas; and
   (f) when the temperature is below $T_c$, the equilibrium vapor pressure of said first gas provides a measure of the temperature of said first sample space.

4. A thermometer as recited in claim 3 wherein:
   (a) said first predetermined pressure of said first and second gases are identical;
   (b) said first predetermined temperature of said first and second gases are identical; and
   (c) said first predetermined temperature of said first and second gases are both room temperature.

5. A thermometer as recited in claim 3 wherein said first and second gases are the same gas.

6. A thermometer as recited in claim 3 wherein said first and second gases are different gases.

7. A thermometer as recited in claim 3 wherein said first gas is selected from the group consisting of helium, neon, and hydrogen.

8. A thermometer as recited in claim 3 wherein said second gas is selected from the group consisting of helium, neon, and hydrogen.

9. A thermometer as recited in claim 3 wherein said first predetermined pressure of said first and second gases are both at least about 80 atmospheres.

10. A thermometer as recited in claim 3 wherein said absorbent is activated carbon.

11. A thermometer as recited in claim 3 wherein said adsorbent is zeolite.

12. A thermometer as recited in claim 3 wherein said pressure difference detecting element is a diaphragm type detector element having a stationary electrode and a moveable electrode opposed thereto.

13. A thermometer as recited in claim 3 wherein said first and second sample spaces are disposed concentrically to each other.

14. A thermometer as recited in claim 13 wherein said first sample space is disposed within said second sample space.

15. A thermometer as recited in claim 14 wherein said first sample space is located inside a quartz tube and said second sample space is located inside a copper tube.

* * * * *